(12) United States Patent
Galler

(10) Patent No.: US 12,510,427 B2
(45) Date of Patent: Dec. 30, 2025

(54) CONNECTION PORT FOR A TEST AND/OR MEASUREMENT DEVICE

(71) Applicant: Rohde & Schwarz GmbH & Co. KG, Munich (DE)

(72) Inventor: Florian Galler, Mering (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 354 days.

(21) Appl. No.: 18/223,869

(22) Filed: Jul. 19, 2023

(65) Prior Publication Data

US 2025/0027826 A1   Jan. 23, 2025

(51) Int. Cl.
*G01L 5/24* (2006.01)

(52) U.S. Cl.
CPC ...................... *G01L 5/24* (2013.01)

(58) Field of Classification Search
CPC ......................................... G01L 5/24
See application file for complete search history.

(56) References Cited

U.S. PATENT DOCUMENTS

2009/0133980 A1   5/2009   Swaim et al.

FOREIGN PATENT DOCUMENTS

| DE | 102014008053 A1 * | 12/2014 | ........... H01R 13/207 |
| DE | 10 2020 132 855 A1 | 6/2022 | |

\* cited by examiner

*Primary Examiner* — Paul M. West
(74) *Attorney, Agent, or Firm* — DITTHAVONG, STEINER, & MLOTKOWSKI

(57) ABSTRACT

The present disclosure relates to a test and/or measurement device, comprising a housing; and a connection port which is mounted to the housing and which is connectable to an external connector. The connection port comprises: at least one signal conductor configured to transmit and/or receive a signal to and/or from the external connector, and a nut comprising a screw thread for screwing on the external connector, wherein the nut is arranged rotatably around the at least one signal conductor. The test and/or measurement device further comprises an electric motor which is coupled to the nut and configured to rotate the nut.

17 Claims, 4 Drawing Sheets

CONNECTION PORT FOR A TEST AND/OR MEASUREMENT DEVICE

TECHNICAL FIELD

The disclosure relates to a test and/or measurement device, such as a vector network analyzer (VNA), a spectrum analyzer or an oscilloscope, with an improved connection port.

BACKGROUND ART

Measurement instruments, such as oscilloscopes, typically have several RF ports for connecting cables with matching RF connectors. To establish a stable connection, the RF connectors are usually screwed or wrenched on the RF ports. However, screwing and unscrewing the RF connectors can be tedious and time consuming, especially if many different cables have to be connected subsequently to the same port. Furthermore, it can be difficult to integrate a measurement instrument with such RF ports in a robot controlled setup.

SUMMARY

Thus, there is a need to provide an improved test and/or measurement device which avoids the above-mentioned disadvantages.

This is achieved by the embodiments provided in the enclosed independent claim. Advantageous implementations of the embodiments of the present disclosure are further defined in the dependent claims.

According to an aspect, the present disclosure relates to a test and/or measurement device. The test and/or measurement device comprises a housing; and a connection port which is mounted to the housing and which is connectable to an external connector, wherein the connection port comprises: at least one signal conductor configured to transmit and/or receive a signal to respectively from the external connector, and a nut comprising a screw thread for screwing on the external connector, wherein the nut is arranged rotatably around the at least one signal conductor. The test and/or measurement device further comprises an electric motor which is coupled to the nut and which is configured to rotate the nut.

This achieves the advantage that a test and/or measurement device is provided which allows for a simplified connection of an external connector. For instance, the external connector, e.g. a female cable connector, can be coupled to the connection port without manual wrenching/screwing.

The test and/or measurement device can be an electronic instrument. For example, the test and/or measurement device is a vector network analyzer (VNA), a spectrum analyzer, a signal analyzer or an oscilloscope.

For instance, the screw thread of the nut is designed for connecting the nut to a corresponding (i.e., complementary) screw thread of the external connector. For example, to establish a connection, a user of the test and/or measurement device can simply hold the external connector to the connection port and the electric motor rotates the nut to establish a screw connection between the connection port and the external connector.

The external connector can be attached to cable and/or can be connected to an external device, e.g. a DUT (device-under-test), a measurement device, a calibration unit or a calibration standard.

For example, the electric motor comprises a rotatable element which is coupled to the nut by means of a rotationally fixed connection, such that the nut rotates when the rotatable element rotates. The rotationally fixed connection can be established by a rotating shaft of the electric motor. The electric motor can be directly coupled to the nut (e.g., directly via the rotating shaft) or indirectly coupled to the nut (e.g., via at least one additional gear unit).

In an implementation form, the at least one signal conductor is arranged to extend along an axis which is parallel and/or coaxial to a rotation axis of the nut.

In an implementation form, the electric motor is connected in a gear free manner to the nut. For instance, the nut is directly coupled to a rotatory shaft of the electric motor.

In an implementation form, the test and/or measurement device comprises a gear unit which is arranged between the electric motor and the nut. For instance, the gear unit can translate a first rotational speed and/or torque provided by the electric motor to a second rotational speed and/or torque which is applied to the nut.

In an implementation form, the screw thread is arranged on an outer surface of the nut and/or the screw thread is arranged on an inner surface of the nut.

For example, the outer surface faces away from the at least one signal conductor, and the inner surface faces towards the at least one signal conductor. Thus, the connection port can be designed to fit to different types of external connectors, e.g. different types of RF connectors.

In an implementation form, the connection port is a coaxial port.

For example, the nut is made from an electrically conductive material and forms an outer conductor of the coaxial port.

In an implementation form, the test and/or measurement device comprises a measurement unit configured to determine a torque which is applied by the electric motor to the nut.

For example, the measurement unit is configured to measure a supply current provided to the electric motor and to determine the torque which is applied by the electric motor to the nut based on the measured supply current.

In an implementation form, the measurement unit is further configured to determine an angle of rotation of a rotatable element of the electric motor and/or of the nut.

The rotatable element of the electric motor can comprise a rotor and/or a rotatable shaft.

In an implementation form, the test and/or measurement device comprises a controller which is configured to control the electric motor to apply a predefined torque to the nut and/or to apply a torque to the nut which deviates from a predefined torque by less than a threshold value.

In an implementation form, the controller is configured to receive information from the measurement unit on the torque applied to the nut.

In an implementation form, the test and/or measurement device comprises a torque measurement unit which is connected to the nut, wherein the torque measurement unit is configured to measure a torque which is externally applied to the nut.

For example, the externally applied torque is applied by a wrench, e.g., when screwing on the external connector. The torque measurement unit can be a torque sensor.

In an implementation form, the electric motor is configured to apply a counter-torque to the nut if the torque measurement unit detects that the externally applied torque is larger than a further threshold value, wherein the electric motor is configured to set the counter-torque such that a resulting torque at the nut does not exceed the further threshold value.

For example, the resulting torque is a "total torque" which acts on the nut resulting from the externally applied torque and the counter-torque.

In an embodiment, the test and/or measurement device further comprises a data storage configured to store a measurement result of the torque measurement unit. For example, the data storage can be configured to store measured torque values.

The stored measurement results can be used for quality control or process monitoring.

In an implementation form, the housing comprises an activation unit, wherein the electric motor is configured to apply a determined torque to the nut if the activation unit is activated.

In an implementation form, the test and/or measurement device comprises 2, 3, 4, 8, 16 or more than 16 connection ports which are mounted to the housing, wherein each of the connection ports is connectable to an external connector, wherein each connection port comprises at least one signal conductor configured to transmit and/or receive a signal to and/or from the external connector; and a nut comprising a screw thread for screwing on the external connector, wherein the nut is arranged rotatably around the at least one signal conductor; wherein the test and/or measurement device further comprises a respective electric motor for each connection port which is configured to rotate the nut.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
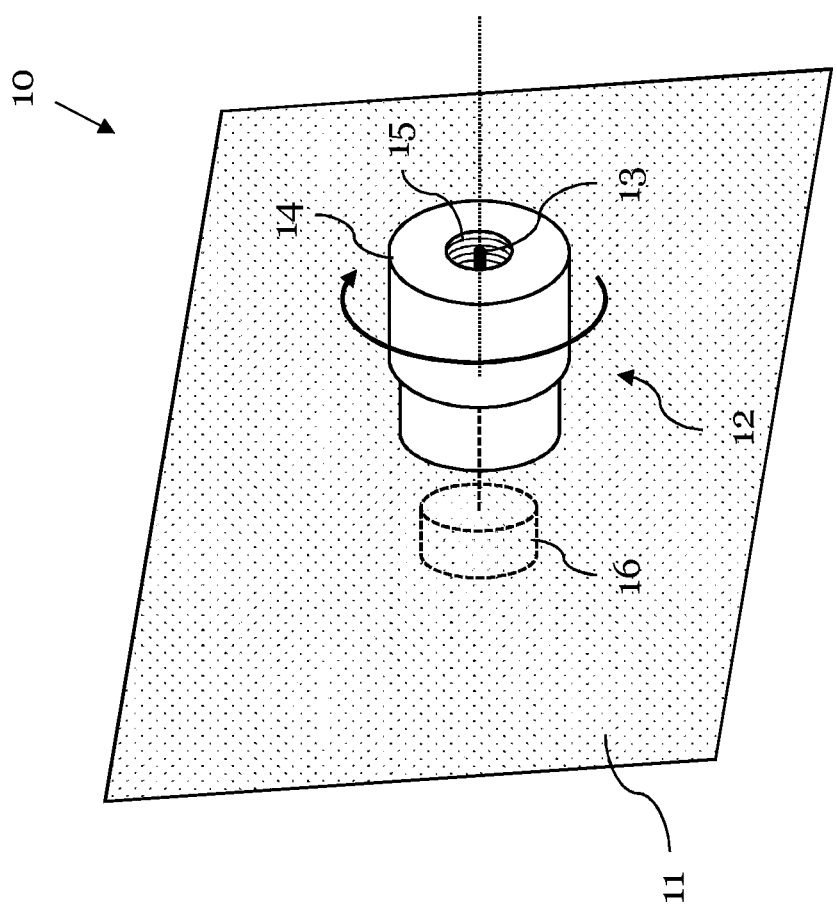
FIG. 1 shows a schematic diagram of a connection port of a test and/or measurement device according to an embodiment.

FIG. 1 shows a schematic diagram of a connection port 12 of a test and/or measurement device 10 according to an embodiment.

The test and/or measurement device 10 comprises a housing 11 to which the connection port 12 is mounted. The connection port 12 is connectable to an external connector and comprises: at least one signal conductor 13 configured to transmit and/or receive a signal to and/or from the external connector, respectively; and a nut 14 comprising a screw thread 15 for screwing on the external connector, wherein the nut 14 is arranged rotatably around the at least one signal conductor 13. The test and/or measurement device 10 further comprises an electric motor 16 which is coupled to the nut 14 and which is configured to rotate the nut 14.

The test and/or measurement device 10 can be an electronic instrument, such as a vector network analyzer (VNA), a spectrum analyzer, a signal analyzer or an oscilloscope. The test and/or measurement device 10 can be a test and/or measurement system. The connection port 12 can be an instrument port or a test port of the test and/or measurement device 10.

The external connector (not shown in FIG. 1) can be a complementary connector which is designed to be mounted on the connection port. For instance, the external connector has a complementary screw thread for screwing on the screw thread of the connection port and a complementary signal conductor which electrically connects to the signal conductor of the connection port when mounted to the port. For instance, a user may simply press the external connector to the nut, and the electric motor rotates the nut to screw the nut to the external connector. This greatly facilitates the connection of external connectors to the connection port, as a manual screwing or wrenching is no longer necessary. In particular, no torque wrench or other lag equipment is required to safely connect the external connector to the connection port.

The external connector can be attached to a cable and/or an external device, such as a DUT, a measurement device, a calibration device or a calibration standard. For instance, the test and/or measurement device is configured to analyze an external device which is connected to the connection port.

The signal can be an electrical signal, e.g. a DC signal or an RF signal. The signal can have a frequency of up to 50, 75, 100, 110, 120 or 130 GHz. The signal can also be an optical signal.

The connection port 12 can be a coaxial port, for example a coaxial RF port. The nut 14 can be made from an electrically conductive material and can form an outer conductor of the coaxial port. The coaxial connection port 12 can comprise a single signal conductor, as shown in FIG. 1, which is arranged coaxially to the rotation axis of the nut 14 (e.g., the signal conductor extends along an axis which is coaxial to the rotation axis of the nut 14). The rotation axis of the nut 14 is indicated by a dotted line in FIG. 1.

Alternatively, the connection port may also comprise multiple signal conductors, which are arranged parallel to the rotation axis. For instance, one of the multiple signal conductors can be arranged coaxially and the rest can be arranged parallel to the rotation axis.

The electric motor 16 can comprise a rotatable element, e.g. a rotor connected to a shaft, which is coupled to the nut 14 by means of a rotationally fixed connection (indicated by a dashed line in FIG. 1), such that the nut 14 rotates when the rotatable element rotates 16.

For example, the electric motor 16 can be connected in a gear free manner to the nut 14. Thus, the rotational speed and/or torque of the rotatable element of the electric motor 16 can be directly applied to the nut 14.

For instance, the nut 14 can be arranged on and/or hold by a non-rotating base body of the connection port 12 which is firmly connected to the housing 11. The nut 14 can form a head of the connection port 12.

The electric motor 16 can be connected to a power supply, e.g. of the test and/or measurement device 10, for receiving electrical energy. The electric motor 16 can generate rotational motion (of the rotating element) through the interaction of magnetic fields.

In the example shown in FIG. 1, the screw thread 15 is arranged on an outer surface of the nut 14, facing away from the signal conductor 13 (external thread).

Figure 2:
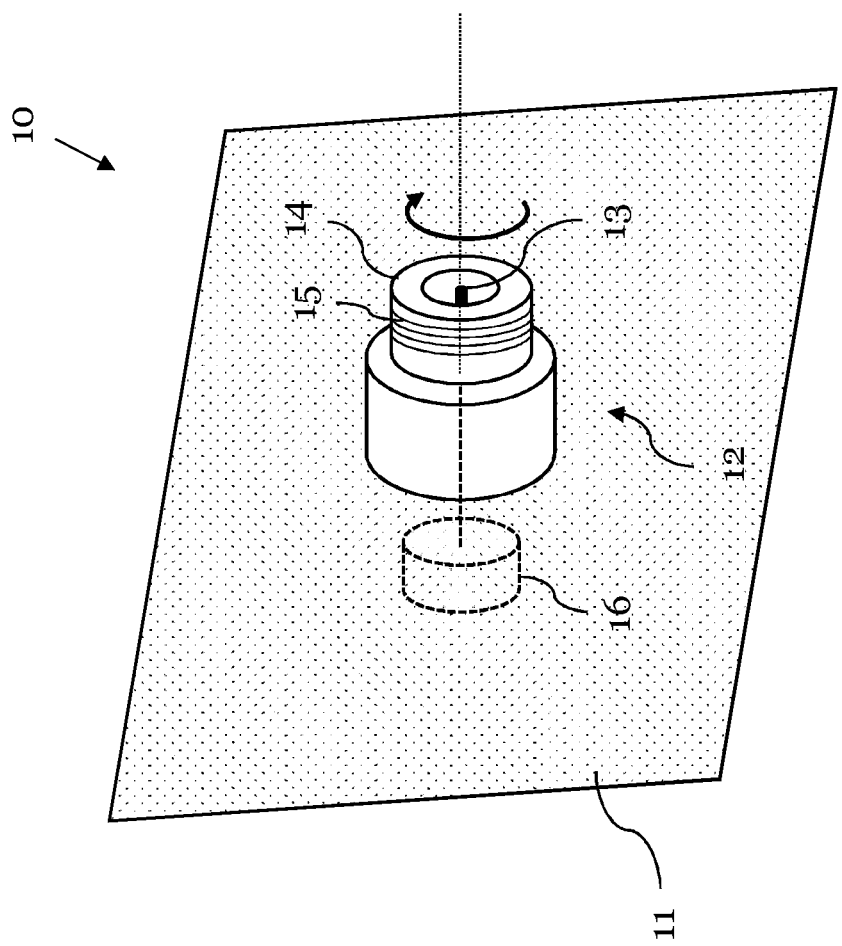
FIG. 2 shows a schematic diagram of a connection port of a test and/or measurement device according to an embodiment.

FIG. 2 shows an alternative design of the connection port 12, wherein the screw thread 15 is arranged on an inner surface of the nut 14, facing towards the signal conductor 13 (internal thread).

The connection port 12 can be an SMA connector or a type-N connector. For instance, the connection port 12 can be a 1.85 mm, 2.4 mm, 2.92 mm or 3.5 mm SMA or type-N connector.

The connection port 12 can be designed as a male or female connection port.

Figure 3:
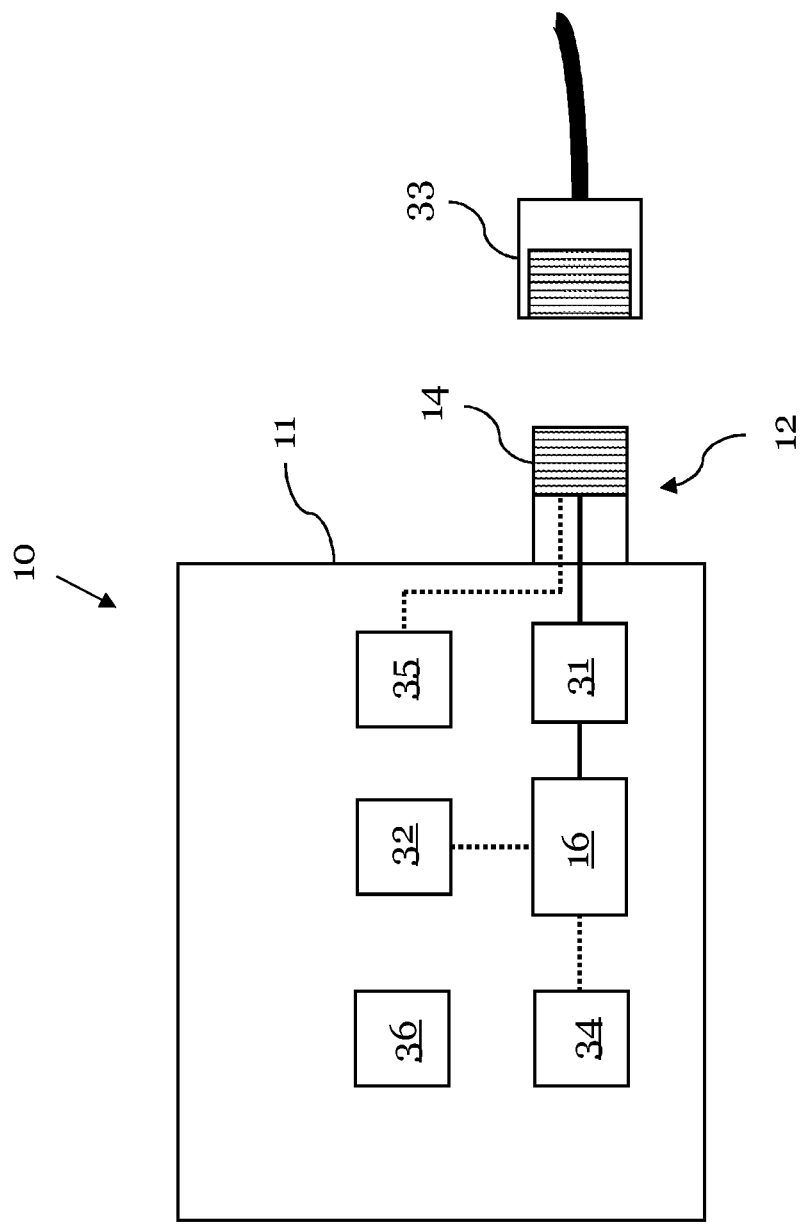
FIG. 3 shows a schematic diagram of a test and/or measurement device according to an embodiment.

FIG. 3 shows a schematic diagram of the test and/or measurement device 10 according to an embodiment. The test and/or measurement device 10 in FIG. 3 comprises a connection port 12, as e.g. shown in FIG. 1 or 2. FIG. 3 further shows the external connector 33 mounted to a cable. The external connector 33 is thereby designed to be screwed on the screw thread of the nut 14.

The test and/or measurement device 10 can comprise a gear unit 31 which is arranged between the electric motor 16 and the rotatable nut 14 and coupled to them. For instance, the gear unit translates a rotational speed and/or a torque provided by the electric motor 16 to another rotational speed and/or torque more suitable for the nut 14.

The test and/or measurement device 10 may further comprise a measurement unit 32 configured to determine a torque which is applied to the nut 14 by the electric motor 16. In particular, the measurement unit 32 determines the torque which is currently applied to the nut 14 by the electric motor 16.

For example, the measurement unit 32 measures a supply current provided to the electric motor 32 and determines the torque based on the measured supply current. For instance, the provided toque can be proportional to the supply current. Thus, the measurement unit 32 can comprise or can be formed by a current sensor.

The measurement unit 32 can further be configured to determine an angle of rotation of a rotatable element of the electric motor 16 and/or of the nut 14. The rotatable element can be a rotor and/or a shaft of the electric motor 16. The shaft can directly or indirectly be coupled to the nut 14.

The test and/or measurement device 10 further comprises a controller 34 which is electrically connected to the electric motor 16 and which is configured to control the electric motor 16 in such a way that the torque which the electric motor 16 applies to the nut 14 reaches a predefined torque and/or deviates from a predefined torque by less than a threshold value. In this way, it can be guaranteed that the torque applied to the nut 14 is suitable for establishing a stable screw connection between the nut 14 and the external connector 33. For instance, a user only has to hold a cable with the external connector to the nut 14 and the electric motor 16 stops turning when the required torque is reached.

For instance, the controller 34 is adapted to receive information from the measurement unit 32 on the torque applied to the nut 14, e.g. via a communication connection between controller 34 and measurement unit 32.

The information can directly correspond to the torque applied to the nut 14. For instance, the measurement unit 32 directly transmits an information on a current torque value, e.g. 0.9 Nm.

Alternatively, the information can indirectly correspond to the torque applied to the nut 14. For instance, the measurement unit 32 transmits information on a current which is used by the electric motor 16 and/or on an angle of rotation of the electric motor 16. The controller 34 can use this information to determine the torque that is currently applied to the nut 14.

The controller 34 can use the information on the current torque (provided by the measurement unit 32) as a feedback signal and can control the electric motor 16 to adjust the applied torque to match the predefined torque or to deviate from the predefined torque by less than the threshold value.

The controller 34 can be formed by a microcontroller and/or processor. The controller 34 can be integrated in a control architecture of the test and/or measurement device 10.

The test and/or measurement device 10 can further comprise a torque measurement unit 35 which is connected to the nut 14 and is configured to measure a torque which is externally applied to the nut 14. For instance, the externally applied torque can be applied by a user when screwing on the external connector 33, e.g. using a wrench.

The torque measurement unit 35 can be a torque sensor which is mechanically coupled to the rotating nut 14. For instance, the torque sensor can determine the torque via a change in shape of a measuring body (e.g. a spring body). Alternatively, the torque sensor can sense the externally applied torque via a piezoelectric, a magneto-elastic or an optical measurement.

For instance, the electric motor 16 can be configured to apply a counter-torque to the nut 14 in case the torque measurement unit 35 detects that the externally applied torque is larger than a further threshold value. The electric motor 16 can thereby set the counter-torque such that a resulting torque at the nut does not exceed the further threshold value. In this way, an excessive torque that is applied by external force can be counteracted.

The test and/or measurement device may further comprise a data storage configured to store a measurement result of the torque measurement unit. For example, the data storage can be configured to store measured torque values. The data storage can also store the counter-torque which is applied to the nut 14 by the electric motor 16.

The housing 11 of the test and/or measurement device 10 can comprise an activation unit 36. The electric motor 16 can be configured to apply a (pre) determined torque to the nut 14 if the activation unit 36 is activated.

For instance, the activation unit 36 comprises an interface, e.g. a button, which is activated by a user input. Upon receiving the user input, the electric motor 16 can apply the predetermined torque to the nut 14.

The activation unit 36 can further identify an external connector 33 to be connected, and the electric motor 16 can apply a torque which is associated with the identified external connector 33 to the nut 14. For this purpose, a number of torque values can be stored in the data storage of the test and/or measurement device 10. For instance, the activation unit 36 can comprise a user interface configured to receive a user input which indicates the external connector 33 to be connected to the connection port 12 (e.g., a connector type or size).

Figure 4:
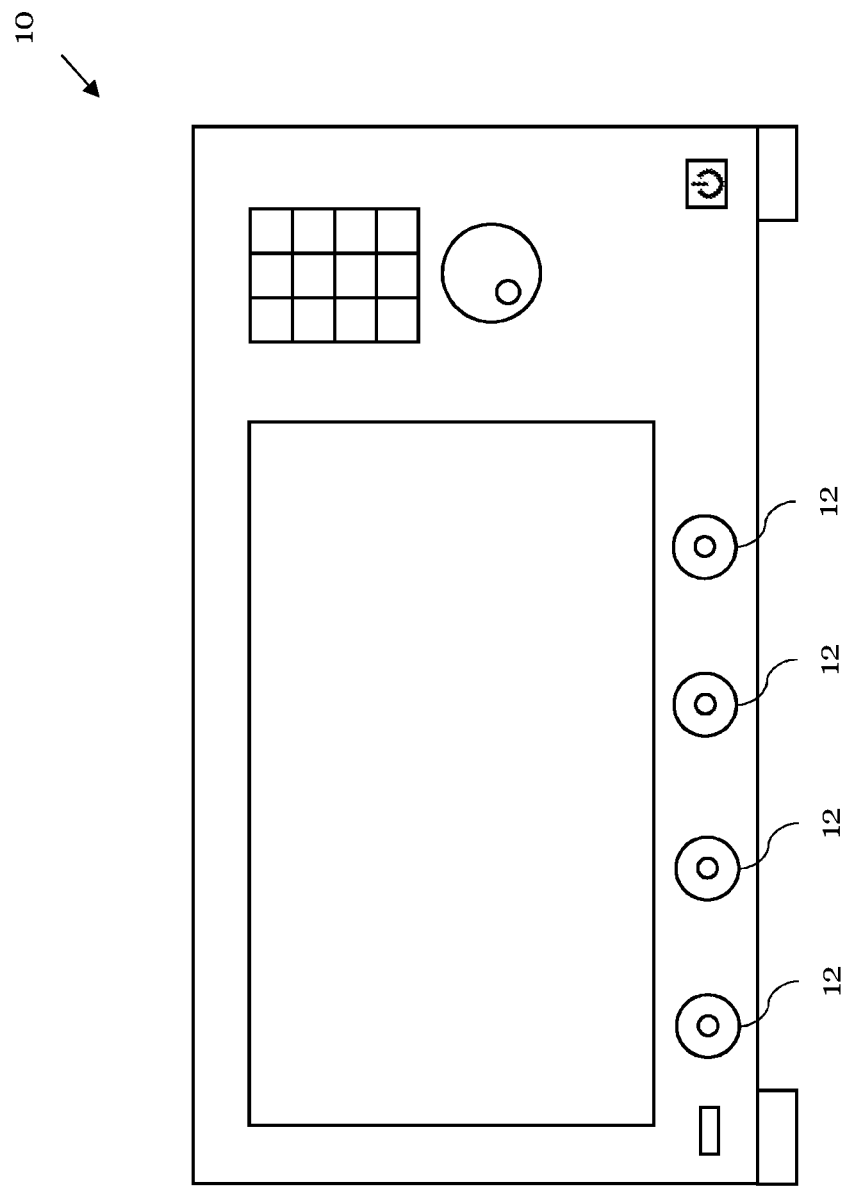
FIG. 4 shows a schematic diagram of a test and/or measurement device comprising multiple connection ports according to an embodiment.

FIG. 4 shows a schematic diagram of a test and/or measurement device 10 comprising multiple connection ports 12 according to an embodiment.

Each of the connection ports 12 of the device 10 in FIG. 4 can be configured according to any one of the connection ports 12 shown in FIGS. 1-3.

For instance, each of the connection ports 12 is connectable to a respective external connector and comprises at least one signal conductor 13 configured to transmit and/or receive a signal to and/or from the respective external connector, and a nut 14 comprising a screw thread 15 for screwing on the external connector, wherein the nut 14 is arranged rotatably around the at least one signal conductor 13. The test and/or measurement device 10 can further comprise a respective electric motor 16 for each connection port which is coupled to the nut 14 of the connection port 12 and which is configured to rotate the nut 14 (it is coupled to).

For example, the test and/or measurement device 10 can comprise 2, 3, 4, 8, 16 or more than 16 connection ports 12.

For each connection port 12, the test and/or measurement device may comprise a respective gear unit 31, measurement unit 32, controller 34, torque measurement unit 35 and/or activation unit 36.

All features described above or features shown in the figures can be combined with each other in any advantageous manner within the scope of the disclosure.

The invention claimed is:

1. A test and/or measurement device, comprising:
   a housing;
   a connection port which is mounted to the housing and which is connectable to an external connector, wherein the connection port comprises:
      at least one signal conductor configured to transmit and/or receive a signal to and/or from the external connector, and
      a nut comprising a screw thread for screwing on the external connector, wherein the nut is arranged rotatably around the at least one signal conductor;
   wherein the test and/or measurement device further comprises an electric motor which is coupled to the nut and configured to rotate the nut.

2. The test and/or measurement device of claim 1, wherein the at least one signal conductor is arranged to extend along an axis which is parallel and/or coaxial to a rotation axis of the nut.

3. The test and/or measurement device of claim 1, wherein the electric motor is connected in a gear free manner to the nut.

4. The test and/or measurement device of claim 1, further comprising:
   a gear unit which is arranged between the electric motor and the nut.

5. The test and/or measurement device of claim 1, wherein the screw thread is arranged on an outer surface of the nut and/or wherein the screw thread is arranged on an inner surface of the nut.

6. The test and/or measurement device of claim 1, wherein the connection port is a coaxial port.

7. The test and/or measurement device of claim 6, wherein the nut is made from an electrically conductive material and forms an outer conductor of the coaxial port.

8. The test and/or measurement device of claim 1, further comprising
   a measurement unit configured to determine a torque which is applied by the electric motor to the nut.

9. The test and/or measurement device of claim 8, wherein the measurement unit is configured to measure a supply current provided to the electric motor and to determine the torque which is applied by the electric motor to the nut based on the measured supply current.

10. The test and/or measurement device of claim 8, wherein the measurement unit is configured to determine an angle of rotation of a rotatable element of the electric motor and/or of the nut.

11. The test and/or measurement device of claim 8, wherein the controller is configured to receive information from the measurement unit on the torque applied to the nut.

12. The test and/or measurement device of claim 1, further comprising:
   a controller which is configured to control the electric motor to apply a predefined torque to the nut and/or to apply a torque to the nut which deviates from a predefined torque by less than a threshold value.

13. The test and/or measurement device of claim 1, further comprising:
   a torque measurement unit which is connected to the nut, wherein the torque measurement unit is configured to measure a torque which is externally applied to the nut.

14. The test and/or measurement device of claim 13, wherein the electric motor is configured to apply a counter-torque to the nut if the torque measurement unit detects that the externally applied torque is larger than a further threshold value;
   wherein the electric motor is configured to set the counter-torque such that a resulting torque at the nut does not exceed the further threshold value.

15. The test and/or measurement device of claim 13, further comprising:
   a data storage configured to store a measurement result of the torque measurement unit.

16. The test and/or measurement device of claim 1, wherein the housing comprises an activation unit, wherein the electric motor is configured to apply a determined torque to the nut if the activation unit is activated.

17. The test and/or measurement device of claim 1, wherein the test and/or measurement device comprises 2, 3, 4, 8, 16 or more than 16 connection ports which are mounted to the housing, wherein each of the connection ports is connectable to an external connector, wherein each connection port comprises:
   at least one signal conductor configured to transmit and/or receive a signal to and/or from the external connector; and
   a nut comprising a screw thread for screwing on the external connector, wherein the nut is arranged rotatably around the at least one signal conductor;
wherein the test and/or measurement device further comprises a respective electric motor for each connection port which is coupled to the nut of the connection port and which is configured to rotate the nut.

* * * * *